July 12, 1955

P. W. HAGE 2,712,752

APPARATUS RESPONSIVE TO VARIATIONS IN
THE VISCOSITY OF A LIQUID
Filed Oct. 26, 1954

Inventor
Pieter W. Hage
By Cushman, Darby & Cushman
Attorneys

United States Patent Office 2,712,752
Patented July 12, 1955

2,712,752

APPARATUS RESPONSIVE TO VARIATIONS IN THE VISCOSITY OF A LIQUID

Pieter W. Hage, Koog Aan de Zaan, Netherlands, assignor to Stamicarbon N. V., Heerlen, Netherlands Application October 26, 1954, Serial No. 464,870

Claims priority, application Netherlands October 29, 1953

8 Claims. (Cl. 73—55)

The present invention relates to apparatus responsive to variations in the viscosity of a liquid passed therethrough which apparatus is especially adapted for continuously measuring the viscosity of a liquid. The term liquid includes a dispersion of solid or liquid material in a liquid.

The invention is concerned with that kind of apparatus, known per se, which comprises an open-topped flow vessel with provision for the continuous feed and discharge of liquid to and from the vessel, and means responsive to changes in the quantity of liquid contained in the said flow vessel.

Such apparatus may be designed to give a visual or other viscosity value indication at any time and/or it may be designed for continuously operating an indicating, recording or control device, e. g., a control device for influencing the flow of liquid in a particular process dependent on the viscosity of such liquid.

In the case of a liquid for which there is an unambiguous relation between viscosity and specific gravity, such apparatus may be used to give specific gravity value indications or to exercise automatic flow or other control dependent on specific gravity.

As examples of the application of viscosity responsive apparatus as aforesaid, I may mention its use in the starch industry for controlling the specific gravity of strach suspensions; in coal or ore washeries for controlling the specific gravity of washing suspensions; in the extraction of viscous substances or of substances forming viscous solutions; in polymerization processes in which a liquid product is formed; in preparing mixtures of lubricating oils.

In apparatus of the kind referred to, as previously proposed, the liquid is fed to the flow vessel under constant pressure through a feed conduit opening within said vessel in which the flow conditions are such that the rate of flow is independent of viscosity, and the liquid discharges from the vessel via a throttle opening such that the discharge rate decreases with increase in viscosity. Consequently fluctuations in viscosity result in fluctuations in the quantity of liquid contained in the vessel from moment to moment, and impulses for actuating an indicating, recording or control device may be yielded as a result of variations in the said quantity of liquid.

It is the main object of the invention to provide apparatus of the kind referred to of greater sensitivity to viscosity variations than the apparatus known hitherto.

A further object of the invention is to provide such apparatus which is less liable to obstruction in those cases where there is danger of such obstruction, e. g., when a liquid is treated consisting of a dispersion of solid matter in a liquid carrier, such as a starch suspension.

Still further objects and the entire scope of applicability of the invention will become apparent from the detailed description and example given hereinafter, in the annexed drawings and in the appertaining claims. It should be understood, however, that the detailed description is given by way of illustration and not of limitation.

According to the invention, in apparatus of the kind referred to, there is included in the liquid flow conduit a flow resistor the resistance of which decreases, when liquid is forced under constant pressure through the feed conduit, with increasing viscosity of the liquid, and conversely.

The use of a flow resistor in the liquid feed conduit which offers a resistance which decreases with increasing viscosity, in combination with a throttle opening in the liquid discharge passage of the flow vessel enables a greater sensitivity to be realised, inasmuch as an increase in viscosity is accompanied not only by a decreasing discharge rate from the vessel but also by an increasing feed rate whereby there is brought about for a given viscosity change a greater extent of variation in the quantity of liquid contained in the vessel.

Moreover, this greater sensitivity may be attained using a liquid discharge passage which is less restricted than in the case of apparatus as previously proposed wherein the throttle opening in the discharge is solely responsible for bringing about fluctuations in the quantity of liquid in the vessel, and this will be of advantage particularly with liquids such, e. g., as some suspension of solid material in a liquid carrier, which are liable to cause obstruction. Where this reduced risk of obstruction is a prime consideration and greater sensitivity is not necessary, the throttle opening in the liquid discharge may be dispensed with and a discharge passage employed which offers a constant flow resistance irrespective of viscosity variations.

Preferably the flow resistor included in the liquid feed conduit is a rotation chamber, comprising a radially symmetrical chamber peripherally bounded by a continuous surface of revolution and having one or more feed passages and one or more discharge apertures arranged so that when liquid is fed continuously into the chamber under sufficient pressure the liquid is set in rapid rotation therein and discharges from the chamber nearer the axis of rotation than the position(s) at which it enters the chamber the liquid in the chamber thereby forming a vortex, i. e., a body of rotating liquid with the angular velocity of rotation increasing as the radius of rotation decreases. At a rise in the viscosity of the liquid the resistance of such a rotation chamber strongly decreases, so that with the feed pressure constant, a greater amount of liquid is allowed to pass.

Preferably the rotation chamber will be arranged at the end of a liquid feed pipe to the flow vessel so that the liquid discharges direct from the discharge aperture(s) of the rotation chamber into the flow vessel.

If a rotation chamber with more than one discharge aperture, e. g., two axial or two or more tangential discharge apertures is employed, it is advisable for the chamber to be arranged at the end of a liquid feed pipe to the flow vessel and be placed below the level of the liquid in the flow vessel. This arrangement reduces the necessary piping so that less power is required for feeding the liquid, while at the same time a compact arrangement of the apparatus is obtained.

It is preferred to employ a rotation chamber which is symmetrical with respect to a plane perpendicular to its axis and is provided with two centrally arranged circular discharge apertures and one or more tangentially directed feed passages whose centre lines lie in the plane of symmetry. Such a rotation chamber has a favourably high volume/wall area ratio so that the friction along the wall of the chamber, which increases with increase in the viscosity of the liquid and consequently opposes the desired effect, is kept low. The shape of chamber which is most favoured is a cylindrical chamber with one or more tangential feed passages leading tangentially into the chamber midway along the length of the cylinder and an axial discharge aperture in each end of the chamber.

It will be appreciated, that the flow vessel to be employed in the present apparatus need not have any particular shape. However, it is preferred for the flow vessel, at least at the lower portion thereof, to be conical in shape, and for the discharge aperture therefrom to be located in the apex of the conical portion. This promotes the flow through of the liquid and reduces risk of obstruction in the case of liquid, such as a suspension, which may form a deposit of a solid or viscous product.

Impulses for actuating an indicating, recording or control device may be obtained and transmitted in different ways. For example, such impulses may be derived in a manner known per se, from changes in the liquid level in the flow vessel.

As with previously proposed apparatus, there should be a constant pressure drop over the liquid feed conduit to the flow vessel, including the flow resistor, in order that the changing resistance offered by the resistor shall be truly dependent on viscosity.

Referring now to the drawings.

Figure 1:
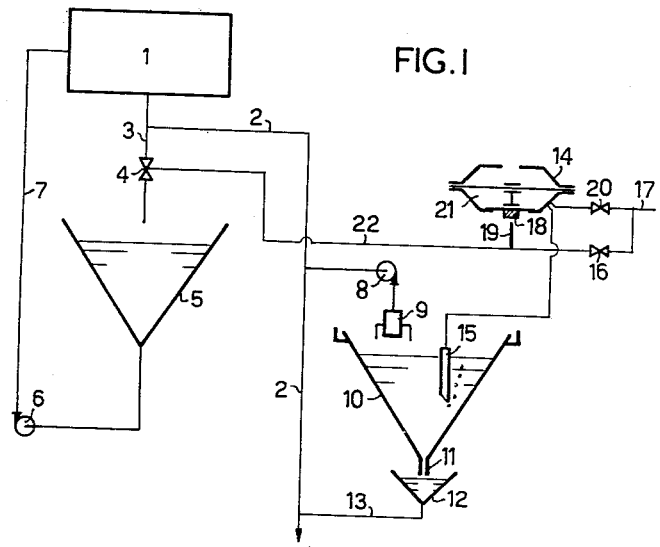
Fig. 1 is a diagram of the control of a process, using apparatus according to the invention.

In Figure 1 the area designated 1 is intended to schematically represent a process unit in which a liquid is formed which is required to have a certain viscosity, e. g., an installation for thickening a starch suspension. The liquid formed, e. g., the thickened starch suspension, is discharged through conduit 2. If the liquid is not sufficiently viscous it has to be discharged mainly through a conduit 3 equipped with a regulating valve 4, so that it is returned for further treatment to the apparatus 1 via pump cistern 5, pump 6 and conduit 7.

To obtain an automatic control of the recycling system, part of the suspension flowing through conduit 2 is drawn off and fed under a constant pressure drop to a rotation chamber 9, by means of a pump 8. The suspension leaving the chamber 9 flows freely into a conical flow vessel 10 with a constant throttle discharge opening 11 and is subsequently returned, via collecting vessel 12 and conduit 13, into conduit 2.

If the viscosity of the suspension discharged through conduit 2 decreases the rate of flow of suspension through the rotation chamber 9 will also decrease, whereas the rate of flow of suspension flowing through the throttle discharge opening 11 increases. In consequence, the level of suspension in the vessel 10 rises and falls in accordance with viscosity variations.

In order to obtain from variations in the level of the suspension in the flow vessel 10 from moment to moment, an impulse suited to operate the regulation valve 4, use is made of a pressure-sensitive member 14, which connects to a dip pipe 15 placed in the flow vessel 10. The regulating valve 4 is operated by means of compressed air which, via a regulating cock 16 and a conduit 22, is drawn from a conduit 17. The pressure of this compressed air is influenced by movement of a baffle member 18 forming part of the pressure-sensitive member 14, towards or away from the outlet of a nozzle 19 connected to the conduit 22. Compressed air also drawn from conduit 17, is passed continuously into the dip pipe 15 via cock 20 and the pressure in the line to the dip pipe, and therefore in the pressure box 21, is a measure of the height of the liquid level in vessel 10 above the outlet of the dip pipe.

If there is a decrease in the viscosity of liquid discharged through conduit 2, the level of the liquid in the flow vessel falls so that the air pressure in the dip pipe 15 and the pressure box 21 decreases. This results in a downward movement of the baffle member 18, so that less air is allowed to escape through the nozzle 19 and pressure builds up in conduit 22, as a result of which the regulating valve 4 opens or, in case that it is already open, the opening of the valve becomes wider, so that the required recirculation is brought about. If there is a rise in the viscosity of the liquid discharged through conduit 2, the opposite result will ensue.

Figure 2:
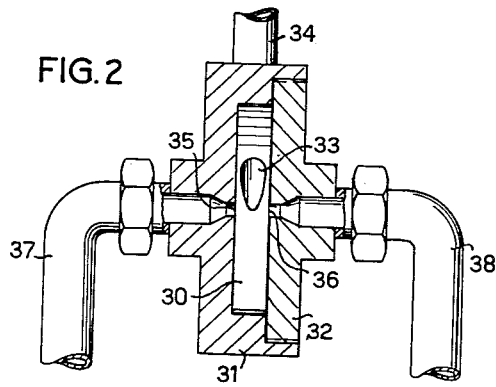
Fig. 2 is a half-section through the rotation chamber used in the apparatus shown in Fig. 1.

The rotation chamber 9 is shown in more detail in Fig. 2, and comprises a cylindrical chamber 30 which is formed in two parts 31 and 32 screw threaded together. The chamber 30 is provided with a feed conduit 34 for the liquid, which leads tangentially into the chamber at 33, and with two axial discharge apertures 35 and 36, which connect to the discharge conduits 37 and 38 respectively.

*Example*

In order to control the process of thickening a maize starch suspension, in which a suspension of about 19° Bé. was desired, use was made of an apparatus according to Fig. 1, comprising a rotation chamber 9 according to Fig. 2, which had the following essential dimensions:

Inner diameter of chamber 30 _____ mm__ 60
Inner diameter of feed conduit 34 _____ mm__ 6
Diameter of discharge apertures 35 and 36 ____ mm__ 4

Part of the suspension produced, which had a temperature of 37° C., was fed to the rotation chamber at a constant gauge pressure of 0.8 atm. From a suspension of 19° Bé. an amount of about 6 litres per minute flowed through the measuring apparatus. The throttle opening 11 of the flow vessel 10 had a diameter of 8 mm.; during the measurement the mean height of the liquid in the flow vessel was about 15 cm.

A very sensitive control was obtained.

I claim:

1. In apparatus responsive to variations in the viscosity of a liquid an open-topped flow vessel for the liquid having a discharge aperture, a liquid feed conduit opening within said flow vessel, a flow resistor in said liquid feed conduit, the resistance of said flow resistor decreasing, when liquid is forced under constant pressure through the feed conduit, with increasing viscosity of the liquid, and means responsive to changes in the quantity of liquid contained in said flow vessel.

2. Apparatus according to claim 1, wherein the flow resistor is a rotation chamber.

3. Apparatus according to claim 1, wherein the resistance to liquid flow of the discharge aperture of the flow vessel is independent of variations in the viscosity of the liquid.

4. Apparatus according to claim 1, wherein the flow resistor is a rotation chamber and the resistance to liquid flow of the discharge aperture of the flow vessel is independent of variations in the viscosity of the liquid.

5. Apparatus according to claim 1, wherein the flow resistor is a rotation chamber which is symmetrical with respect to a plane perpendicular to its axis and is provided with two centrally arranged circular discharge apertures and at least one tangentially directed feed passage, the center line of which lies in the plane of symmetry.

6. Apparatus according to claim 1, wherein the flow resistor is a rotation chamber which is symmetrical with respect to a plane perpendicular to its axis and is provided with two centrally arranged circular discharge apertures and at least one tangentially directed feed passage, the center line of which lies in the plane of symmetry and the resistance to liquid flow of the discharge aperture of the flow vessel is independent of variations in the viscosity of the liquid.

7. In apparatus for continuously measuring the viscosity of a liquid an open-topped flow vessel for the liquid having a discharge aperture, a liquid feed conduit opening within said flow vessel, a flow resistor in said liquid feed conduit, the resistance of said flow resistor decreasing, when liquid is forced under constant pressure through the feed conduit, with increasing viscosity of the liquid, means for continuously forcing the liquid under constant pressure through said feed conduit, and means responsive to changes in the quantity of liquid contained in said flow vessel.

8. In apparatus for controlling a process dependent on the viscosity of a liquid an open-topped flow vessel for the liquid having a discharge aperture, a liquid feed conduit opening within said flow vessel, a flow resistor in said liquid feed conduit, the resistance of said flow resistor decreasing, when liquid is forced under constant pressure through the feed conduit, with increasing viscosity of the liquid, means for continuously forcing the liquid under constant pressure through said feed conduit, means responsive to changes in the quantity of liquid contained in said flow vessel, and control means activated by said responsive means.

References Cited in the file of this patent

UNITED STATES PATENTS

| | | |
|---|---|---|
| 1,925,833 | French | Sept. 5, 1933 |
| 2,010,837 | Albersheim et al. | Aug. 13, 1935 |
| 2,131,379 | Lay | Sept. 27, 1938 |
| 2,233,561 | Kalle | Mar. 4, 1941 |